US010079710B2

(12) United States Patent
Dahl et al.

(10) Patent No.: US 10,079,710 B2
(45) Date of Patent: Sep. 18, 2018

(54) SYSTEM AND METHOD FOR DYNAMIC FILE AVAILABILITY DURING ENCODING

(71) Applicant: Brightcove, Inc., Boston, MA (US)

(72) Inventors: Jonathan H. Dahl, San Francisco, CA (US); Brandon Arbini, Middleton, WI (US); Justin R. Greer, Madison, WI (US); Nathan L. Sutton, San Francisco, CA (US)

(73) Assignee: Brightcove, Inc., Boston, MA (US)

( * ) Notice: Subject to any disclaimer, the term of this patent is extended or adjusted under 35 U.S.C. 154(b) by 300 days.

(21) Appl. No.: 13/767,363

(22) Filed: Feb. 14, 2013

(65) Prior Publication Data

US 2013/0219074 A1 Aug. 22, 2013

Related U.S. Application Data

(60) Provisional application No. 61/599,861, filed on Feb. 16, 2012.

(51) Int. Cl.
*H04L 29/06* (2006.01)

(52) U.S. Cl.
CPC ...... *H04L 29/06482* (2013.01); *H04L 65/601* (2013.01); *H04L 65/605* (2013.01); *H04L 65/607* (2013.01); *H04L 65/608* (2013.01)

(58) Field of Classification Search
CPC .......... H04L 65/4084; H04N 19/00472; H04N 21/2343

(Continued)

(56) References Cited

U.S. PATENT DOCUMENTS 5,798,726 A * 8/1998 Schuchman ......... G08G 5/0013
342/32
6,570,926 B1 * 5/2003 Agrawal et al. ......... 375/240.27
(Continued)

FOREIGN PATENT DOCUMENTS

EP    2242272 A2 * 10/2010    ......... H04N 7/17318
EP    2242272 A2    10/2010
(Continued)

OTHER PUBLICATIONS

International Search Report and Written Opinion for International Patent Application No. PCT/US2013/026391 dated Jun. 10, 2013 (9 pages).

(Continued)

*Primary Examiner* — Arvin Eskandarnia
(74) *Attorney, Agent, or Firm* — Kilpatrick Townsend & Stockton LLP (57) ABSTRACT

A method for dynamic file availability during remote transfer and transcoding involves the conversion of a non-streamable media file to a streamable format prior to transcoding, and the streaming of the transcoded file before ingest and transcode is complete. A first portion of a non-streamable media file is received at an ingest server for transcoding. Upon determining that the first portion does not include a header, the probable location of the header in the media file is determined and a header portion of the file is received at the ingest server. The first portion is combined with at least part of the header to produce a first streamable segment. Prior to receiving the last portion of the media file at the ingest server, the first streamable segment is transcoded at a first transcode server to produce a first transcoded streamable segment.

26 Claims, 5 Drawing Sheets

(58) Field of Classification Search
USPC .................................................... 709/231
See application file for complete search history.

(56) References Cited

U.S. PATENT DOCUMENTS

| | | | | |
|---|---|---|---|---|
| 6,801,764 | B2* | 10/2004 | Purpura | H04B 7/18508 455/404.1 |
| 7,082,124 | B1* | 7/2006 | Katukam | H04J 3/14 370/352 |
| 7,082,567 | B1* | 7/2006 | Young | G06F 9/4443 707/999.001 |
| 7,251,287 | B1* | 7/2007 | Lifshitz | H04B 1/0007 375/222 |
| 7,257,628 | B2* | 8/2007 | Liskov | H04L 67/42 709/223 |
| 7,529,806 | B1* | 5/2009 | Shteyn | H04N 7/17318 705/50 |
| 7,742,487 | B2* | 6/2010 | Bugenhagen | H04L 12/5692 370/401 |
| 7,860,642 | B2* | 12/2010 | Sandell | G08G 5/0082 701/120 |
| 8,046,821 | B2* | 10/2011 | Nguyen | H04L 63/0823 709/201 |
| 2005/0070320 | A1* | 3/2005 | Dent | H04W 72/005 455/516 |
| 2005/0071650 | A1* | 3/2005 | Jo | G06F 21/55 713/188 |
| 2005/0113069 | A1* | 5/2005 | Knauerhase | G06F 21/43 455/411 |
| 2005/0187677 | A1* | 8/2005 | Walker | B64C 13/20 701/16 |
| 2005/0193068 | A1* | 9/2005 | Brown | G06Q 10/107 709/206 |
| 2006/0008087 | A1* | 1/2006 | Olive | G01S 13/782 380/255 |
| 2006/0080451 | A1* | 4/2006 | Eckert | G06F 9/544 709/230 |
| 2006/0120395 | A1* | 6/2006 | Xing | H04B 7/0613 370/431 |
| 2007/0050517 | A1* | 3/2007 | Doi | G11B 27/031 709/236 |
| 2007/0067837 | A1* | 3/2007 | Schuster | H04L 63/0209 726/11 |
| 2007/0088467 | A1* | 4/2007 | H. Knotts | G01C 23/005 701/14 |
| 2007/0123258 | A1* | 5/2007 | Sawyer | H04W 36/0061 455/436 |
| 2007/0174428 | A1* | 7/2007 | Lev Ran | G06F 9/546 709/218 |
| 2007/0218871 | A1* | 9/2007 | Bonner | H04W 8/08 455/406 |
| 2008/0049781 | A1* | 2/2008 | Bugenhagen | H04L 12/5692 370/465 |
| 2008/0086554 | A1* | 4/2008 | Royalty | H04L 63/1408 709/224 |
| 2008/0086637 | A1* | 4/2008 | Royalty | H04L 63/105 713/168 |
| 2008/0192629 | A1* | 8/2008 | Chari | H04L 47/10 370/230 |
| 2008/0282336 | A1* | 11/2008 | Diaz Cuellar | H04L 63/0263 726/11 |
| 2009/0012663 | A1* | 1/2009 | Mead | G01W 1/10 701/14 |
| 2009/0058682 | A1* | 3/2009 | True | H04L 12/66 340/971 |
| 2009/0132330 | A1* | 5/2009 | Shaw | G06F 9/542 705/7.29 |
| 2010/0023247 | A1* | 1/2010 | Sandell | G08G 5/0013 701/120 |
| 2010/0131671 | A1* | 5/2010 | Kohli et al. | 709/233 |
| 2010/0266009 | A1 | 10/2010 | Sedeffow | |
| 2011/0311199 | A1* | 12/2011 | Fay | G11B 27/034 386/241 |
| 2013/0083848 | A1* | 4/2013 | Joch et al. | 375/240.12 |
| 2013/0232233 | A1* | 9/2013 | Reza | 709/219 |

FOREIGN PATENT DOCUMENTS

| | | | | |
|---|---|---|---|---|
| EP | 2413287 A1 * | 2/2012 | | G06T 15/20 |
| GB | 2514292 A | 11/2014 | | |
| JP | 2003114845 A | 4/2003 | | |
| JP | 2015-515167 A | 5/2015 | | |
| WO | 2005/25225 A1 | 3/2005 | | |
| WO | WO-2010/030627 A1 | 3/2010 | | |

OTHER PUBLICATIONS

Patent Examination Report No. 1 from IP Australia dated Apr. 17, 2015 for Appln. No. 2013221337, 2 pages.
Notice of Acceptance from IP Australia for Appln. No. 2013221337, acceptance date Feb. 9, 2016, 2 pages.
International Preliminary Report on Patentability for PCT/US2013/026391 dated Aug. 19, 2014, 7 pages.
Certificate of Grant, Standard Patent for AU 2013221337 dated Jun. 16, 2016, 1 page.
Examination Report No. 1 for AU 2016203706 dated Mar. 24, 2017, 3 pages.
Office Action dated Jan. 26, 2017 for Canadian Patent Application No. 2,864,827, all pages.
Office Action dated Mar. 7, 2017 for Japanese Patent Application No. 2014-557820, all pages.

* cited by examiner

SYSTEM AND METHOD FOR DYNAMIC FILE AVAILABILITY DURING ENCODING

CROSS-REFERENCE TO RELATED APPLICATIONS

This application claims priority to and the benefit of U.S. Provisional Patent Application Ser. No. 61/599,861, filed Feb. 16, 2012, and entitled "System and Method for Dynamic File Availability During Encoding," the disclosure of which is hereby incorporated by reference in its entirety.

FIELD OF THE INVENTION

The present disclosure relates generally to computer systems and, more particularly, to a system and method for file availability during encoding.

BACKGROUND

Transcoding is the direct conversion of digital data from one encoding to another, such as for movie data files or audio files. Transcoding is performed for many reasons, including cases where a target device (or workflow) does not support the format or has limited storage capacity or bandwidth that mandates a reduced file size, or to convert incompatible or obsolete data to a better-supported or modern format. For example, Apple® ProRes is widely used as a common format for digital video, but the data size of a two-hour movie in those formats can be substantial. The large size can increase the cost and difficulty of handling movie files. Transcoding these types of files into, e.g., a MPEG-4 format can compress them to less than 10% of their size.

Transcoding is commonly a lossy process, introducing generation loss. The process of lossy-to-lossy transcoding introduces varying degrees of generation loss. In other cases, the transcoding of lossy to lossless or uncompressed formats is technically a lossless conversion because no information is lost, however the process is irreversible and is more suitably known as "destructive."

Video transcoding can be a slow process, taking many minutes or hours, even with the fastest available hardware. File-based transcoding is usually entirely asynchronous—the transcoded file cannot be used until the process is complete.

Traditionally, when video files are transcoded: (1) transcoding does not start until the entire file is available in the transcoding system for transcoding, (2) the resultant transcoded file cannot be played until transcoding is complete, or (3) both (1) and (2).

Under current practice, it is difficult to process a file while it is still being written. Existing approaches can only read in (and process/output) a file in its current, incomplete state, regardless of whether it is still being written. If an existing technology is able to read in (and process/output) a file as it is written, there is no available knowledge of when the file has been completely written to non-transient storage.

Existing programs assume a file (i.e., not a pipe or stream) is complete or whole and not growing on disk, so the programs typically fail if they try to read a file that is still being written. This cannot be solved using a chain of pipe commands, or "tee" commands with pipes. If any of the processes in the pipe-chain fail, the entire set of processes stops. Pipe-based commands do not allow for retrying from the beginning of the file. Furthermore, some files cannot be processed as a stream—some level of random access is needed. Further, some existing programs are unable to read from pipes. When using a named pipe, if a reader stops reading, the buffer fills and tee can no longer write the file, so processing halts indefinitely.

Other existing approaches, such as using "cat" and "tail" on a file, also have limitations. Cat will only read the entire file as it exists at that point in time—it will not wait for the file to finish being written. Tail (with option "-c 0" to start reading from the beginning of the file, and option "-f" to continue following the end of the file as it is being written) will wait indefinitely for further data until it is stopped by an external process.

SUMMARY OF THE INVENTION

A system and method for dynamic file availability during encoding are disclosed. The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

Accordingly, in one aspect, a method for dynamic file availability during remote transfer and transcoding involves the conversion of a non-streamable media file to a streamable format prior to transcoding, and the streaming of the transcoded file before ingest and transcode is complete. A first portion of a non-streamable media file is received at an ingest server for transcoding. Upon determining that the first portion does not include a header, the probable location of the header in the media file is determined and a header portion of the file is received at the ingest server. The first portion is combined with at least part of the header to produce a first streamable segment. Prior to receiving the last portion of the media file at the ingest server, the first streamable segment is transcoded at a first transcode server to produce a first transcoded streamable segment.

In one embodiment, the first portion of the media file and the header portion of the media file are received from a remote server.

In another embodiment, the location of the header is determined based on the first portion of the media file.

In yet another embodiment, the first transcoded streamable segment is transmitted. Transmission of the first transcoded streamable segment may occur prior to transcoding the last portion of the media file. Transmission of the first transcoded streamable segment may occur prior to receiving the last portion of the media file at the ingest server.

In further implementations, a second portion of the non-streamable media file is received at the ingest server for transcoding. The second portion of the media file is combined with at least part of the header to produce a second streamable segment. Further, the second streamable segment is transcoded at a second transcode server to produce a second transcoded streamable segment.

In one embodiment, the second portion of the media file is received while simultaneously transcoding the first portion of the media file.

In another embodiment, the second portion of the media file is transcoded while simultaneously transcoding the first portion of the media file.

In yet another embodiment, the second portion of the media file is transcoded while simultaneously transmitting the first transcoded streamable segment.

In a further embodiment, additional portions of the non-streamable media file are received at the ingest server, and the additional portions are transcoded at one or more transcode servers until the media file is fully transcoded. Each additional portion of the non-streamable media file may start at a keyframe.

In another aspect, a system for dynamic file availability during remote transfer and transcoding includes an ingest server and a transcode server. The ingest server is configured to receive a plurality of portions of a non-streamable media file for transcoding, determine whether a first received portion of the media file includes a header, determine a location of the header in the media file, receive a header portion of the media file including the header, and combine the first received portion of the media file with at least part of the header to produce a first streamable segment. The transcode server is configured to transcode the first streamable segment to produce a first transcoded streamable segment, with the first streamable segment being transcoded prior to the ingest server receiving the last portion of the media file.

In one embodiment, the first portion of the media file and the header portion of the media file are received from a remote server.

In another embodiment, the location of the header is determined based on the first portion of the media file.

In yet another embodiment, the transcode server is further configured to transmit the first transcoded streamable segment. Transmission of the first transcoded streamable segment may occur prior to a transcode server transcoding the last portion of the media file. Transmission of the first transcoded streamable segment may occur prior to receiving the last portion of the media file at the ingest server.

In further implementations, the system includes a second transcode server. The ingest server is further configured to receive a second portion of the non-streamable media file for transcoding and combine the second portion of the media file and at least part of the header to produce a second streamable segment. The second transcode server is configured to transcode the second streamable segment to produce a second transcoded streamable segment.

In one embodiment, the second portion of the media file is received while simultaneously transcoding the first portion of the media file.

In another embodiment, the second portion of the media file is transcoded while simultaneously transcoding the first portion of the media file.

In yet another embodiment, the second portion of the media file is transcoded while simultaneously transmitting the first transcoded streamable segment.

In a further embodiment, additional portions of the non-streamable media file are received at the ingest server, and the additional portions are transcoded at one or more transcode servers until the media file is fully transcoded. Each additional portion of the non-streamable media file may start at a keyframe.

Other aspects and advantages of the invention will become apparent from the following drawings, detailed description, and claims, all of which illustrate certain principles of various embodiments the invention, by way of example only.

BRIEF DESCRIPTION OF THE DRAWINGS

The accompanying drawings, which are included as part of the present specification, illustrate the presently preferred embodiment and, together with the general description given above and the detailed description of the preferred embodiment given below, serve to explain and teach the principles of the present invention.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

The present system provides for a video or audio file to be decodable during the process of transcoding, including ingest from a remote source. The result is dramatically reduced latency such that before transcoding (and/or ingest) is complete, a file can be viewed or decoded for some other purpose (e.g., post-processing).

The following is a glossary of terms used throughout the present disclosure.

Headers: (Meta)data included in a file that describes the rest of the data, often including an indication of the type of data that is in the rest of the file as well as structural information about the layout of the data in the file.

MP4: Generic ISO base media container file format commonly used for storage of audio and video streams.

Box: In an MP4 file, a specific piece of (meta)data.

Tee command: A function that takes a stream of input and writes out two copies: one to a file on disk, and one to an output stream.

Pipe: An operating-system level (size-limited) buffer that takes the output stream of one process and sends it to the input stream of another process.

Fifo: A special file that acts like a pipe (i.e., first-in-first-out), except the processes interacting with it can access it with normal file-access commands. Fifo is limited in that a writing process sees it as a write-only stream, and the reading process sees it as a read-only stream.

Random access: Instead of reading a file/stream (or writing a stream) in order of the file/stream data, the data may be read/written from/to different parts of the file at different times, out of order.

Cat: A function that reads data from either an input stream or a file on disk, and writes the data to an output stream. Cat can read multiple files and output them sequentially, hence the name (from "concatenate").

Tail: A function that reads data from the end of a file (starting at a default or pre-specified point) and writes it to an output stream, and optionally can be put in "follow" mode so it continues to read more data and output that data as the file is written.

Lsof: A function that lists files open by the processes on the system. Various options may be specified to have it only list processes for a single file, to exclude processes from the list, to run continually so that it periodically outputs an updated list, and also to stop running once the list it outputs is empty.

According to one embodiment, the present system enables a video and/or audio file to be transferred, decoded, viewed, or otherwise used during the transcoding process, and/or while the file is being transferred from a remote system for ingestion. It will be appreciated that while the present disclosure utilizes a video as an example, the present system is applicable to both video, audio, and other media files. Video, as used herein, therefore refers to any video, audio, or other media file to which the techniques described herein may be applied.

According to one embodiment, the present system enables a video to be viewed or otherwise used before transcoding and/or ingest is complete by using any video streaming mechanism, e.g., RTP, RTMP, HTTP Live Streaming, HTTP Dynamic Streaming, Smooth Streaming, or MPEG DASH.

According to one embodiment, the present system enables encoding based on requirements or settings determined just-in-time by an individual user of a video (e.g., detecting a user's bandwidth to be 950 kbit/s and encoding a custom version of the video specifically for that user), and optionally caching the encoded file for other users.

According to one embodiment, the present system enables on-the-fly rewriting of files using formats (such as ISO media, MP4) with header data at the end, moving those headers to the front of the file before the entire file is downloaded in order to allow the file to be transcoded and viewed using the present process.

According to one embodiment, the present system enables dynamically adjusting the number of download connections and the byte ranges downloaded by each connection in order to either (1) transfer files as quickly as possible, ensuring in-order delivery of bytes by the time the transcoder gets to each section (when transfer is the bottleneck), or (2) throttle bandwidth (when transcoding is the bottleneck).

According to one embodiment, the present system streams a file to a pipe while the file is still being written (the Streaming File Reader) by utilizing features similar to Unix "cat" and Unix "tail-f". The present system reads the file from disk starting from the beginning and outputs it to an output stream, which can then be piped into other processes. When the system receives a specific external signal, instead of stopping, the "follow" mode is turned off. This way, if the system has already read/processed all data from the file, it quits immediately, but if there is more data in the file, it continues reading/processing until it reaches the end of the file. This solves the problem of not exiting the Streaming File Reader immediately when the file is written, since data may still be streaming to another program.

The present system determines if the file is still being written by using the "lsof" program, or similar function, and adjusting the lsof options so that the command will wait until the Streaming File Reader is the only program accessing the specific file (at which point it can be assumed that the full file is written). At that point, the system stops reading the file.

The present system proves useful in any situation where a file needs to be streamed to another application while it is still being transcoded or otherwise modified. Examples include: (1) streaming a file from a transfer process to a transcode process (including streaming the file to one or more remote transcode servers) while it is being transferred from a remote server; and (2) streaming a file from one video processing process to another while the first process is still happening, such as streaming from a video decode process to a video encode process, or from a transcode process to a transfer process.

According to one embodiment, the present system rearranges or reconstructs media files that do not have their headers at the beginning of the file, and can still process them in a streaming manner.

Some file formats can have their headers at the end of the file, which means that if the file is downloaded in order, the information necessary to start processing it is not available until the file has been completely downloaded. In the following explanation, generic MP4 style formats are used but the feature is applicable to other file formats with a similar structure.

According to one embodiment, the present system analyzes the beginning of a file, as it is transferred and determines if the headers are available at the beginning or are elsewhere in the file. If the headers are not at the beginning, a separate transfer process is launched to retrieve the headers from the file. The headers are rewritten and prepended to streams that are read/written from the file as it transfers.

These steps provide for processing the file before the entire file has been transferred. The steps are described in detail below.

1. Determine if the headers are at the beginning of the file:

The present system waits until enough of the file has been downloaded to find at least one 'moov' or 'mdat' box. The 'moov' box contains headers, and the 'mdat' box contains the media data. In nearly every case, only one of each of these boxes exists in an MP4 file. If the 'moov' box precedes the 'mdat' box in the file, the headers are at the beginning and no further work needs to be done. If the 'mdat' box precedes the 'moov' box, it is first determined if the time to transfer the file is above a specific threshold that makes it worth rewriting. This is calculated based on the file size and the current transfer rate. (When headers are placed at the end of the file, the 'mdat' box will have its size listed before the data). If it is determined it is worth rewriting the file, then the present system uses the size of the 'mdat' box to determine the location of the 'moov' box (possibly preceded or followed by other metadata). One skilled in the art will appreciate that various other methods are available for determining whether a file is worth rewriting.

2. Launch a separate process to download the headers from elsewhere in the file:

The present system first determines if the transfer protocol supports downloading partial files. If so, the present system uses the location/offset determined where the 'moov' box should start and, in a separate thread/process, downloads a partial file starting from that offset and continuing to the end of the file, or the end of the 'moov' box. The transfer may occur simultaneously with the transfer of other portions of the file. The present system then inspects this partial file to see if it contains valid MP4 boxes, and if so, whether the 'moov' box appears as expected. If so, the present system continues by rewriting those headers in the separate process.

3. Rewrite the headers and prepend them to the stream:

The present system recalculates all of the file offset locations of each chunk of data, because the prepended headers change the absolute offset within the file for each chunk. This is calculated by using the size of the separately-downloaded headers, plus a small amount of buffer space, as well as any other initial data preceding the 'mdat' box, as the final amount to adjust the data chunk offsets by. To create new headers, the present system creates a new file that begins with the 'ftyp' box from the beginning of the downloaded file, and then rewrites the 'moov' box, by adding the pre-calculated adjustment to each data chunk location specified anywhere within the tree of headers inside the 'moov' box. A 'free' box is added with a size that accounts for the small amount of buffer space added, plus the size of any data preceding the 'mdat' box in the original file. This facilitates ignoring any other header data in the file that might confuse other processing software down the line. Finally, zeroes are added to the end of the new header file to account for the rest of the size of buffer space added. The configuration of the main processing thread is then altered so that when it reads the data file, it instead reads both the new headers file and the original data file together, one after the other. Thus, it appears to other software as if the headers were originally at the beginning of the file.

The main processing thread also performs an extra step whenever the headers of the file are rewritten. It joins the new headers and the original file into one new file on-disk, but excluding the original 'moov' box from the original data file because software that reads the whole file in random-access mode may consider a 'moov' box at the end of the file as more authoritative than one at the beginning of the file. This new file is used for any further on-disk processing, as well as serves as the authoritative cached version of the file so that header-rewriting is unnecessary during subsequent actions.

An advantage of the present system includes enabling watching or other use of the transcoded file for various purposes (e.g., decoding the file for playback while it is streaming) before transcoding and/or ingest from a remote server is complete. In other words, portions of a file can be transcoded prior to receiving the last portion of the file for ingestion. As described herein, non-streamable formats (e.g., those with headers not at the beginning of the file) are manipulated into streamable formats prior to transcode. It is to be appreciated that the techniques described herein are applicable to a variety of streamable and non-streamable media formats, including those with headers at any position within the file.

A further advantage of the present system includes enabling a business to defer transcoding its content until a user actually attempts to play the transcoded version. This reduces the total amount of transcoding required, e.g. if some versions may never be requested for playback. Additionally, this reduces the total amount of storage required for the original video and all transcoded versions thereof.

A further advantage of the present system includes enabling decisions about resolution and bitrate to be made on demand based on the exact delivery situation desired. For example, consider a user operating a computer with 950 kbps of available bandwidth and requesting a video for playback on the computer. According to one embodiment, the present system detects the 950 kbps bandwidth of the user computer and transcodes a new version at that exact bitrate and begins playing the 950 kbps version immediately. This transcoded file is then cached for reuse by the next user. In addition to bandwidth/bitrate, the system transcodes custom versions on demand based on a wide range of other factors, such as resolution, video/audio codec, video/audio codec profile, and streaming format.

A further advantage of the present system includes enabling the immediate utilization of improved encoding software and/or settings without re-encoding the entire content library.

Figure 1:
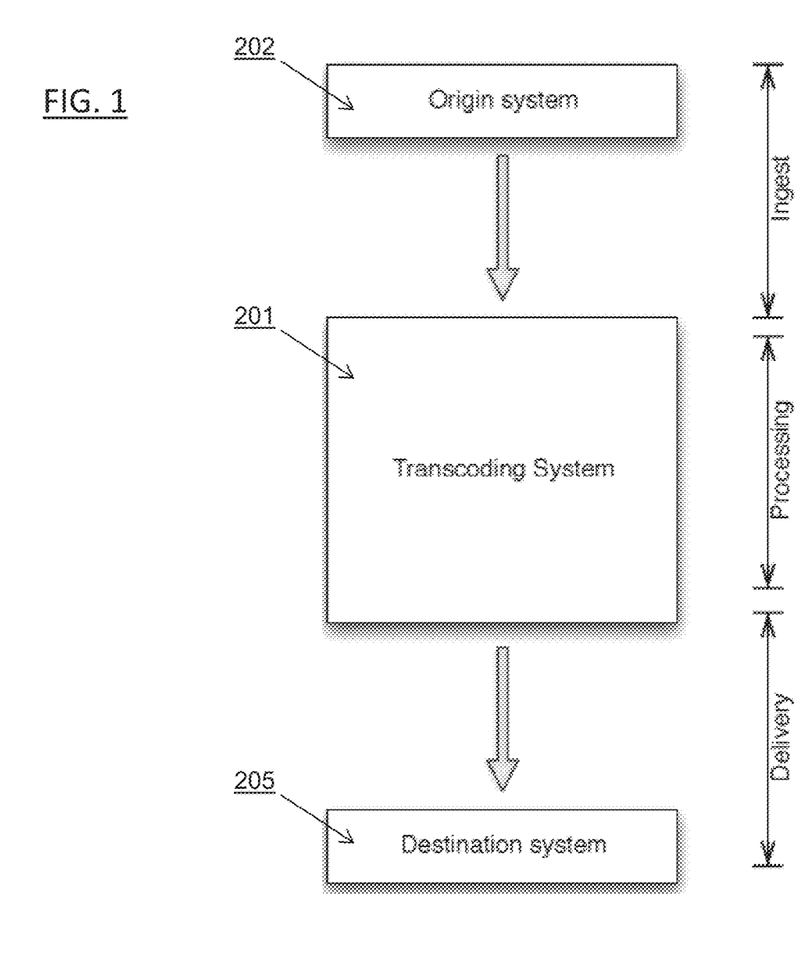
FIG. 1 illustrates an exemplary transcoding architecture for use with the present system, according to one embodiment.

FIG. 1 illustrates an exemplary transcoding architecture for use with the present system. A transcoding architecture includes an origin system 202 where a file that requires transcoding resides. The file is uploaded to a transcoding system 201, and while the file is transcoded, the partially-transcoded file is delivered to a destination system 205.

Figure 2:
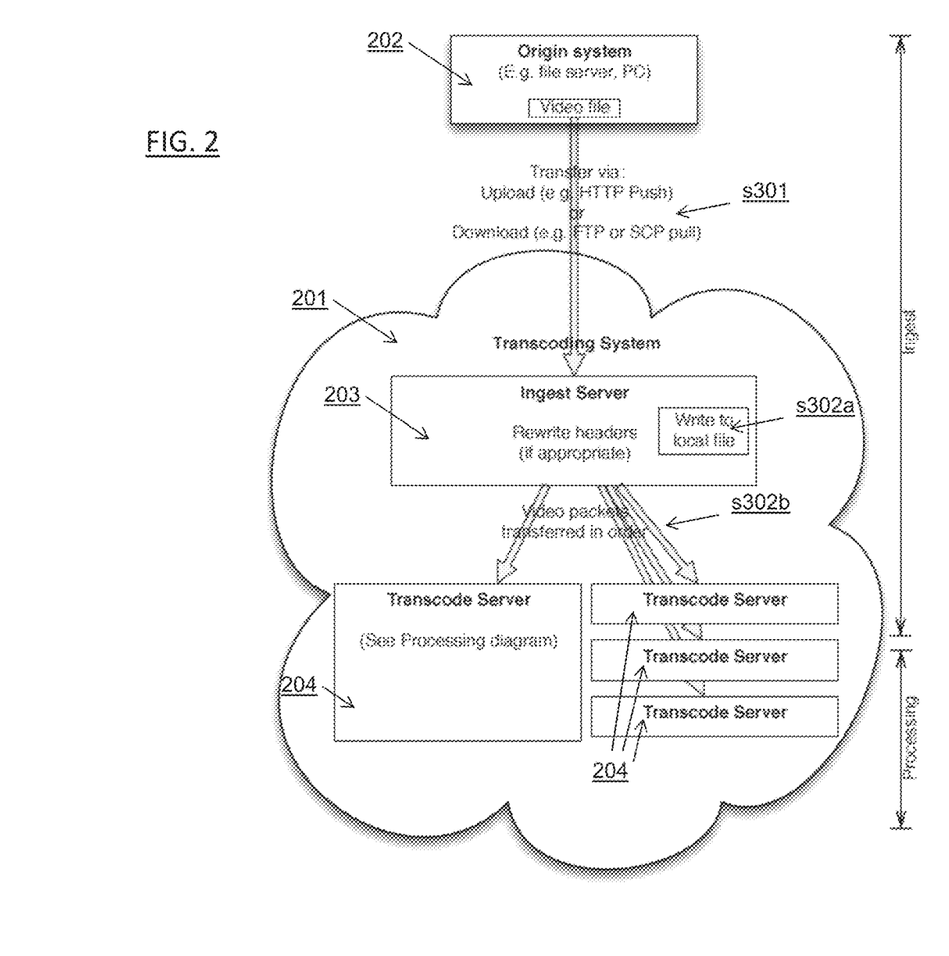
FIG. 2 illustrates exemplary ingest and processing modules of a transcoding architecture for use with the present system, according to one embodiment.

FIG. 2 illustrates exemplary ingest and processing modules of a transcoding architecture for use with the present system, according to one embodiment. As the data is processed, it is streamed in the direction indicated by the arrows and, as such, each step may be performed on portions of the data in parallel without waiting for prior steps to complete. According to one embodiment, a video file resides on an origin system 202. The video file is transferred (step 301) to a transcoding system 201. The video file is transferred via download (pull) from the origin system 202 or upload (push) from the origin system 202 to the transcoding system 201. As the video file is transferred, the file is written to a local file (step 302a) within one or more ingest servers 203. Simultaneously (or in parallel) with writing the file (step 302a), the file is streamed (step 302b) into video transcoding software at one or more transcode servers 204 while the file is still transferring to the ingest server(s) 203.

Figure 3:
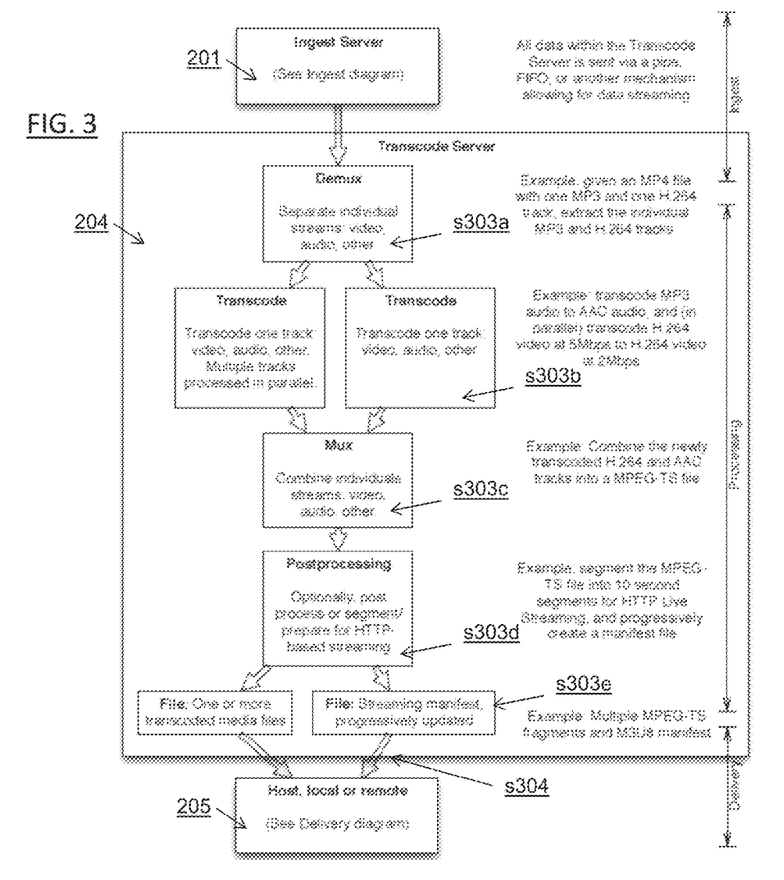
FIG. 3 illustrates an exemplary processing module of a transcoding architecture for use with the present system, according to one embodiment.

FIG. 3 illustrates an exemplary processing module of a transcoding architecture for use with the present system, according to one embodiment. As the data is processed, it is streamed in the direction indicated by the arrows and, as such, each step may be performed on portions of the data in parallel without waiting for prior steps to complete. During processing, the received video (or audio) file is de-multiplexed (step 303a) to separate individual streams (video, audio, or other). As an example, a received MP4 file contains an MP3 and an H.264 track, and the individual MP3 and H.264 tracks are extracted. The separated streams are then transcoded (step 303b) in parallel. Continuing with the previous example, the MP3 audio is transcoded to AAC audio, and (in parallel) the H.264 audio at 5 Mbps is transcoded to H.264 video at 2 Mbps. The newly transcoded individual streams are combined (or multiplexed) (step 303c). Continuing with the previous example, the transcoded H.264 and AAC tracks are combined into an MPEG-TS file. Optionally, the combined file is post-processed, segmented, or prepared for streaming (step 303d). Continuing with the previous example, the MPEG-TS file is segmented into 10 second segments for HTTP live streaming. This results in a finished file (step 303e) including one or more transcoded media files or a progressively updated streaming manifest.

Figure 4:
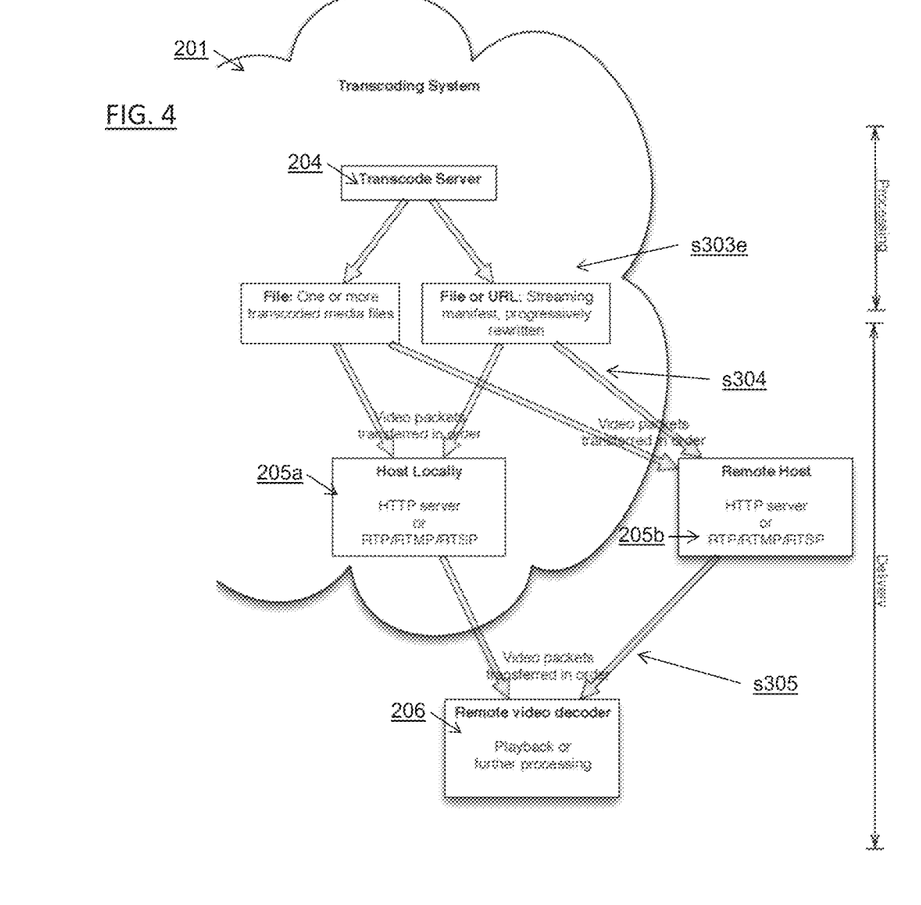
FIG. 4 illustrates exemplary processing and delivery modules of a transcoding architecture for use with the present system, according to one embodiment.

FIG. 4 illustrates exemplary processing and delivery modules of a transcoding architecture for use with the present system, according to one embodiment. The transcoding system 201 delivers (step 304) the finished video progressively, before the entire file has finished transcoding (steps 303a-303e) or even before the entire file has been transferred from the origin server 202. Delivery (step 304) is accomplished by streaming to a remote server, uploading to a remote server, or by making the file available for download or streaming on the local server (205, 205a, 205b).

According to one embodiment, the transcoding system 201 outputs a segmented streaming format such as Apple HTTP Live Streaming. In this case, the video transcoding system 201 outputs video into multiple segments, e.g. a 60 second video is output as 6 individual 10-second segments of video, using a segmented format such as HTTP Live Streaming or the segmented version of MPEG DASH. The individual video segments are either uploaded to a remote server immediately after each segment is complete, or else the segments are hosted locally and made available for download immediately from the local server. The video transcoding system 201 also outputs a streaming manifest file (e.g. a .M3U8 file for HTTP Live Streaming), and makes the file available for user download before transcoding is complete. The transcoding system 201 progressively updates the streaming manifest as new streaming segments are finished, such that each new segment is listed in the streaming manifest after it is complete, but before the entire file is finished transcoding.

According to one embodiment, when the transcoding system 201 receives a remote file (or a portion thereof) that does not have its file metadata at the front of the file, such as MP4 files with headers (e.g. the moov atom) at the end of the file, the transcoding system 201 initiates a second, separate download, retrieving the headers from elsewhere in the file. The location of the headers may, in some cases (such as ISO media), be determined by parsing the beginning of the remote file as it downloads and determining the position of the headers based on this beginning data. The transcoding system 201 then dynamically creates a new file with reconstructed headers at the front of the file in order to create a video that is substantially identical to the original file, but which can be streamed into a decoder. For example, given a MP4 file with a moov atom at the end of the file, the transcoding system 201 will simultaneously download the front of the file (the movie data, or mdat atom) and the end of the file (the moov atom), and will create a new MP4 file with a valid, reconstructed moov atom at the front, and with the mdat atom appended to the new file as it is downloaded. This new reconstructed file is then simultaneously streamed into the video transcoding software. Transcoding of the reconstructed file may occur simultaneously with ingestion of the file, with transcoding of other reconstructed files, and/or with transmission of reconstructed files from the transcode server(s) in the transcoding system 201.

According to one embodiment, a remote file that is streamed into the transcoding system 201 is incomplete. In this version, the file is transferred to the transcoding system 201 while it is still being streamed into the origin system 202, and the transcoding system 201 transcodes and delivers portions of the file even while the file is still being transferred (ingested) into the origin system 202.

According to one embodiment, one remote file is transcoded to multiple derivatives. Saving to disk occurs over the network rather than over a local file system. In other words, the remote file is transferred to a single server within the network of the transcoding system 201, and as bits are transferred in, they are progressively streamed to multiple transcode servers 204, such that more than one server 204 simultaneously transcodes the original file to one or more transcoded files for output, each of which follows the rest of the present transcoding process.

According to one embodiment, the present transcoding process outputs to a range of streaming formats, including HTTP Live Streaming, HTTP Dynamic Streaming, Smooth Streaming, MPEG DASH, RTMP, and RTSP.

According to one embodiment, the present transcoding process is triggered by an operator or another software system via an API call.

According to one embodiment, incomplete files within the present system are simultaneously served from the transcoding system and delivered to a more permanent location.

According to one embodiment, if a file cannot be encoded during the present transcoding mechanism (e.g. if the format cannot be streamed into the decoder, or cannot be streamed from the encoder, or requires two passes of encoding in a way that requires the entire first pass to be complete before the second pass), the system automatically fails over to a traditional transcoding approach for that portion of the process. Other portions of the present transcoding mechanism are still used. For example, if an output file cannot be streamed out of the system in a way that allows for playback or decoding before encoding is complete (e.g. in the case of MP4 output that will have its moov atom moved to the front of the file after transcoding), the other portions of the process continue, and this results in faster overall processing due to the efficiencies of decoding the file during the inbound transfer process.

According to one embodiment, a file is encoded using multi-pass encoding (two or more passes). In this case, the second pass may need to wait until the first pass is complete, but other aspects of the present transcoding mechanism continue, and the file is still playable before the last pass is complete (though not before the first pass is complete).

According to one embodiment, each pass of multi-pass encoding is performed in parallel, in a way that allows the later passes to use as much of the prior passes as is actually complete. For example, given two pass encoding, the first pass could be performed at a faster pace and given a head start such that when the second pass starts, it has first pass analysis data for a portion of the file (but not the complete file). As the first pass runs, the second pass receives progressively more data. This may result in slightly less efficient placement of bits, since the second pass will have less data to work with, but will result in less first-pass latency.

According to one embodiment, individual frames of the video are exported as images progressively during the transcoding process. For example, the system may export frame 300 as a PNG file as soon as frame 300 is decoded, but before the remaining frames are all decoded. This exported image file may be immediately made available for viewing, and/or transferred to a remote system.

According to one embodiment, input or output file transfer is too slow to allow for real-time playback or decoding of the file created through the present transcoding system. In this case, the file is processed using the present transcoding system, and is available for decoding at a slower rate.

According to one embodiment, the present transcoding system includes a built-in server for delivering the content. For example, the system may include a HTTP server for HTTP-based delivery, or a RTMP/RTSP server for RTMP/RTSP streaming delivery.

According to one embodiment, the present transcoding system is coupled with a hosting system or origin server that encodes files when requested and caches the encoded files for a period of time to allow for optimized storage and encoding costs. For example, if a file will only be requested once, it should be encoded and not cached. If it will be requested many times, it should be cached so that it does not need to be transcoded again.

According to one embodiment, the present system supports dynamic transfer optimization. Rather than downloading the remote file via a single connection, or via two connections in the case of files which have headers at the end of the file, the present system employs multiple connections to download the file more quickly. In this case, the byte ranges retrieved by each connection may be dynamically determined based on the speed of transcoding and speed of transfer in order to ensure that the video never needs to buffer because of a gap between the bits downloaded by an earlier connection. This method ensures that transfer happens as quickly as possible, and does not become a bottleneck to the transcoder.

According to one embodiment, the present system includes various workflow details. Given a file that downloads at X frames per second, and transcodes at Y frames per second, the present transcoding system opens one download connection for the beginning of the file. The present transcoding system may open a second download connection to retrieve headers at the end of the file, if necessary. Once the system has established the approximate transfer rate and transcoding rate, an optimal number and distribution of download connections is determined. For example, it can be determined that one connection should download the bytes 0-1,000,000 of a video, and the second connection should download the bytes 1,000,001-1,500,000. Based on transfer speed and transcoding speed, the system does not block before it gets to byte 1,000,000. The system can adaptively start and stop new connections in order to ensure in-order delivery of the video without buffering.

Rather than downloading the remote file as quickly as possible, the system may decide to throttle download to match the actual transcoding or delivery speed. In other words, if the transcoder can only transcode or deliver 500 kbit/s, and the system can transfer at up to 2000 kbit/s, the system may decide to slow down inbound transfer to 500 kbit/s to preserve network bandwidth.

According to one embodiment, when transfer is slower than transcoding, the first method is used (using multiple connections to download more quickly, while guaranteeing in-order delivery). When transcoding is slower than transfer, the second method is used (throttling transfer to match transcoding speed).

Incomplete, in-progress transcoded files can be made playable in a few ways. Files can be streamed via HTTP or FTP from the transcoding system to another server. For example, the output of transcoding software can be piped or streamed directly to upload software, which can deliver the transcoded bits to the destination server as soon as they are available. The destination server can then be responsible for making the partial file playable by using a HTTP or streaming server. Alternately, the transcoding system can stream out the partial file while it is incomplete, by running a server (e.g. a HTTP or RTMP server) local to the incomplete transcoded file. The player will reference this temporary location during the transcoding process. When transcoding is complete and the final file has been delivered to its final location, the transcoding system will notify the playback system of a new URL—the URL of the completed file—and the playback system will then switch over to using the new URL. At this point, the temporary file on the transcoding system may be removed or may be cached for a period of time.

Delivery of formats like ISO Media (MP4) is more difficult, because these formats have headers in one place that need to be written when transcoding is complete, and may need to be moved to the front of the file. The following represents a mechanism for applying this process to ISO Media (MP4) output.

The transcoded file is uploaded using a multipart upload mechanism. The transcoding system estimates the size of the final moov atom, and reserves that space at the front of the final file. Transcoded parts of movie data (mdat atom) are uploaded to the final destination server first.

When transcoding is complete, the moov atom is uploaded to the front of the file. If the previous steps have been successful, at this point, a valid "faststart" MP4 file now exists on the remote server (that is, a MP4 file with its moov atom moved to the front of the file, to allow for streaming or progressive download). If the space reserved for the moov atom is inadequate, the moov/mdat headers are rewritten and the entire file is re-uploaded.

To make the MP4 file playable, the transcoding system estimates the size of the final moov atom, and writes a provisional moov atom with as much information as it can possibly infer ahead of time. Enough information is written to make the MP4 file playable with the provisional moov atom in front.

According to one embodiment, the transcoding process is parallelized as follows. At the beginning of the process, the transcoding system retrieves file metadata, e.g., via headers. For a range of formats (the Parallel Formats), the system is able to retrieve information about keyframe placement. The transcoding system uses this keyframe information to download valid segments of the file onto multiple computers, with each segment starting on a keyframe. If necessary (e.g., in the case of MP4 content), each computer also downloads the file headers and dynamically reconstructs a valid file by combining the moov atom from the original file along with some valid segment of the file to create a shorter, but decodable, file. This dynamically reconstructed segment is then passed into the transcoding system and is processed in the manner that is described above. Each segment is uploaded using multipart upload to a remote server. When the upload of each segment is complete, the server has a single valid file.

In alternative embodiments, transfer optimization is used for any purpose where a file is processed at the same time as it is transferred—any process that allows processing via in-order streaming of a file, rather than requiring random access to the entire file.

Figure 5:
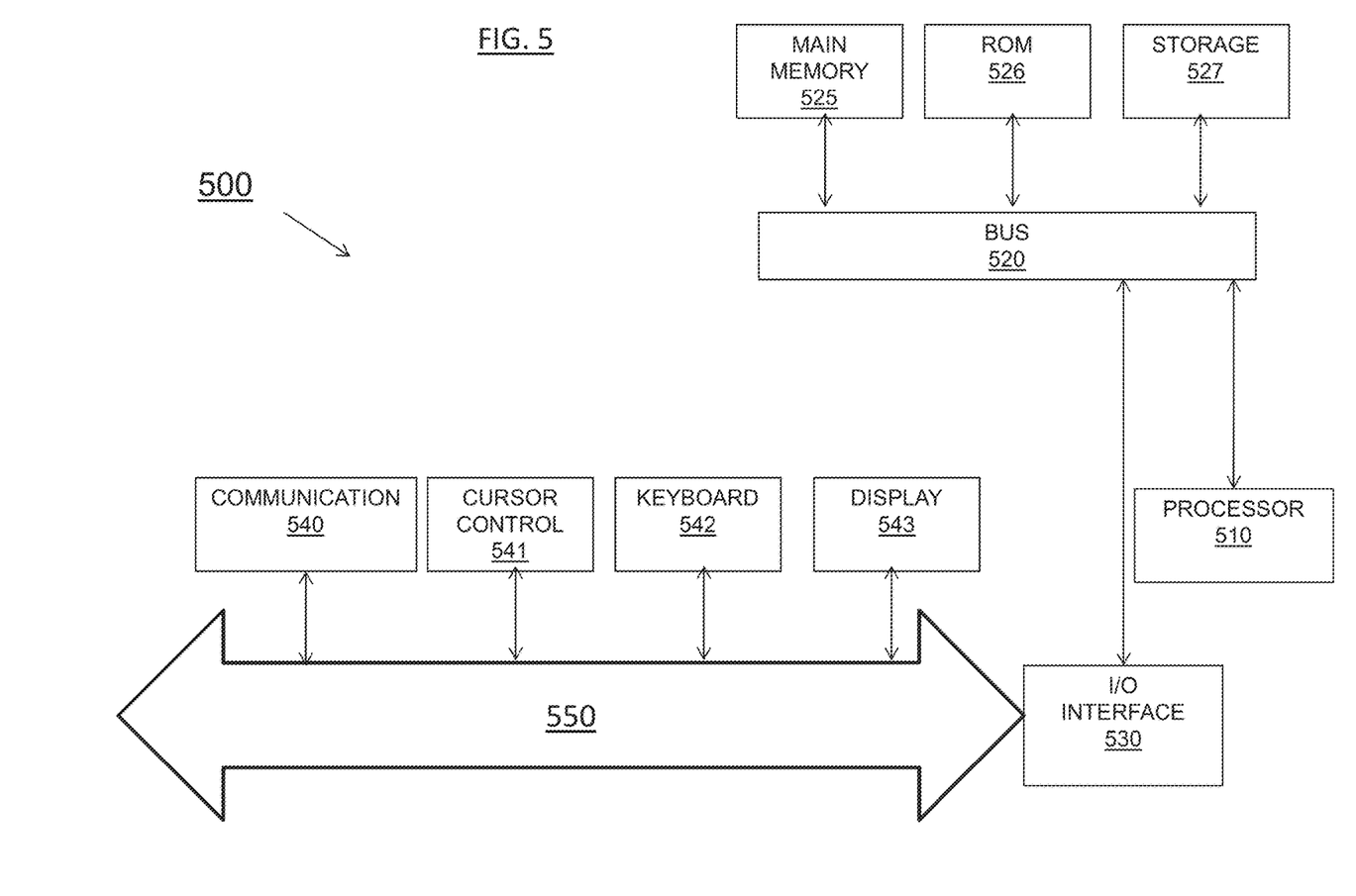
FIG. 5 illustrates an exemplary computer architecture for use with the present system, according to one embodiment.

FIG. 5 illustrates an exemplary computer architecture for use with the present system, according to one embodiment, and the servers and systems described herein may be implemented in accordance with the illustrated architecture. One embodiment of architecture 500 comprises a system bus 520 for communicating information, and a processor 510 coupled to bus 520 for processing information. Architecture 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Architecture 500 also may include a read only memory (ROM) and/or other static storage device 526 coupled to bus 520 for storing static information and instructions used by processor 510.

A data storage device 527 such as a magnetic disk or optical disc and its corresponding drive may also be coupled to computer system 500 for storing information and instructions. Architecture 500 can also be coupled to a second I/O bus 550 via an I/O interface 530. A plurality of I/O devices may be coupled to I/O bus 550, including a display device 543, an input device (e.g., an alphanumeric input device 542 and/or a cursor control device 541).

The communication device 540 allows for access to other computers (servers or clients) via a network. The communication device 540 may comprise one or more modems, network interface cards, wireless network interfaces or other well-known interface devices, such as those used for coupling to Ethernet, token ring, or other types of networks.

In the description above, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer and executed by a processor. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A system and method for dynamic file availability during encoding have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

What is claimed is:

1. A method for dynamic file availability during remote transfer and transcoding, the method comprising:
    receiving, at an ingest server, a first portion of a non-streamable media file for transcoding, wherein the non-streamable media file has a beginning;
    determining, by a first process executing on the ingest server, that a header of the non-streamable media file is not located at the beginning of the non-streamable media file;
    determining, by the first process executing on the ingest server, a location of the header in the non-streamable media file based on data in the first portion of the non-streamable media file;
    automatically launching, by the ingest server, a second process to download the header from the location in the non-streamable media file;
    rewriting, by the second process, the header to produce a rewritten header, wherein the rewritten header is a different size than the header, and wherein rewriting the header includes:
        calculating file offset locations to account for a size of the rewritten header, and
        rewriting the header to include the file offset locations;
    altering, by the ingest server, a configuration of the first process to read the rewritten header before the first portion of the non-streamable media file upon receiving an instruction to read the first portion of the non-streamable media file;
    prepending, by the ingest server, the rewritten header to the first portion of the non-streamable media file to produce a streamable media file prior to receiving a last portion of the non-streamable media file at the ingest server; and
    transmitting, by the ingest server, the first portion of the streamable media file with the rewritten header to a transcoding server for transcoding.

2. The method of claim 1, further comprising:
    transcoding, at the transcoding server, the first portion of the streamable media file wherein the first portion of the streamable media file is received from a remote server.

3. The method of claim 2, further comprising transmitting the transcoded first portion of the streamable media file.

4. The method of claim 3, wherein the transmitting of the transcoded first portion of the streamable media file occurs prior to transcoding the last portion of the streamable media file.

5. The method of claim 4, wherein the transmitting of the transcoded first portion of the streamable media file occurs prior to receiving the last portion of the non-streamable media file at the ingest server.

6. The method of claim 1, wherein the second process downloads the header simultaneously with the first process downloading other portions of the non-streamable media file.

7. The method of claim 1, further comprising:
receiving, at the ingest server, additional portions of the non-streamable media file for transcoding;
transmitting, by the ingest server, the additional portions of the non-streamable media file to the transcoding server as additional portions of the streamable media file; and
transcoding, by the transcoding server, the first portion of the streamable media file and the additional portions of the streamable media file until the streamable media file is fully transcoded.

8. The method of claim 7, wherein each additional portion of the non-streamable media file starts at a keyframe.

9. The method of claim 1, wherein rewriting the header includes adding an instruction in the rewritten header to ignore bytes of data based on a calculation of a location of media data in the non-streamable media file.

10. The method of claim 1, further comprising:
storing, by the transcoding server, the streamable media file in a cache.

11. The method of claim 1, wherein calculating the file offset locations includes accounting for a size of the header plus a buffer.

12. The method of claim 1, further comprising:
calculating a transfer time based on a size of the non-streamable media file and a transfer rate; and
determining that the transfer time is above a threshold value.

13. The method of claim 1, wherein determining that the header of the non-streamable media file is not located at the beginning of the non-streamable media file includes determining that an 'moov' box precedes an 'mdat' box in the non-streamable media file.

14. A system for dynamic file availability during remote transfer and transcoding, the system comprising:
an ingest server for:
receiving a first portion of a non-streamable media file for transcoding, wherein the non-streamable media file has a beginning,
determining, by a first process executing on the ingest server, that a header of the non-streamable media file is not located at the beginning of the non-streamable media file,
determining, by the first process, a location of the header in the non-streamable media file based on data in the first portion of the non-streamable media file,
automatically launching a second process to download the header from the location in the non-streamable media file,
rewriting, by the second process, the header to produce a rewritten header, wherein the rewritten header is a different size than the header, and wherein rewriting the header includes:
calculating file offset locations to account for a size of the rewritten header, and
rewriting the header to include the file offset locations,
altering a configuration of the first process to read the rewritten header before the first portion of the non-streamable media file upon receiving an instruction to read the first portion of the non-streamable media file, and
prepending the rewritten header to the first portion of the non-streamable media file to produce a streamable media file prior to receiving a last portion of the non-streamable media file at the ingest server; and
a transcode server for:
transcoding the first portion of the streamable media file,
wherein the transcode server is configured to transcode the first portion of the streamable media file prior to the ingest server receiving the last portion of the non-streamable media file.

15. The system of claim 14, wherein the non-streamable media file is received from a remote server.

16. The system of claim 14, wherein the second process downloads the header simultaneously with the first process downloading other portions of the non-streamable media file.

17. The system of claim 14, wherein the transcode server is further for transmitting the transcoded first portion of the streamable media file.

18. The system of claim 17, wherein the transmitting of the transcoded first portion of the streamable media file occurs prior to the transcode server transcoding the last portion of the streamable media file.

19. The system of claim 18, wherein the transmitting of the transcoded first portion of the streamable media file occurs prior to receiving the last portion of the non-streamable media file at the ingest server.

20. The system of claim 14, wherein the ingest server is further for:
receiving additional portions of the non-streamable media file;
transmitting the additional portions of the non-streamable media file to the transcode server as additional portions of the streamable media file; and
wherein the transcode server is further for:
transcoding the first portion of the streamable media file and the additional portions of the streamable media file until the streamable media file is fully transcoded.

21. The system of claim 20, wherein each additional portion of the non-streamable media file starts at a keyframe.

22. The system of claim 14, wherein rewriting the header includes adding an instruction in the rewritten header to ignore bytes of data based on a calculation of a location of media data in the non-streamable media file.

23. The system of claim 14, wherein calculating the file offset locations includes accounting for a size of the header plus a buffer.

24. The system of claim 14, wherein the transcode server is further for:
storing the streamable media file in a cache.

25. The system of claim 14, wherein the ingest server is further for:
calculating a transfer time based on a size of the non-streamable media file and a transfer rate; and
determining that the transfer time is above a threshold value.

26. The system of claim 14, wherein determining that the header of the non-streamable media file is not located at the beginning of the non-streamable media file includes determining that an 'moov' box precedes an 'mdat' box in the non-streamable media file.

* * * * *